(12) United States Patent
Okamoto et al.

(10) Patent No.: US 12,384,294 B2
(45) Date of Patent: Aug. 12, 2025

(54) DRIVING SUPPORT DEVICE, DRIVING SUPPORT METHOD, AND DRIVING SUPPORT PROGRAM FOR NOTIFYING A DRIVER OF A VEHICLE OF A TARGET OBJECT APPROACHING THE VEHICLE

(71) Applicant: TOYOTA JIDOSHA KABUSHIKI KAISHA, Aichi (JP)

(72) Inventors: Kazuya Okamoto, Toyota (JP); Tsunekazu Yasoshima, Nagoya (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 49 days.

(21) Appl. No.: 18/237,414

(22) Filed: Aug. 24, 2023

(65) Prior Publication Data

US 2024/0067086 A1 Feb. 29, 2024

(30) Foreign Application Priority Data

Aug. 31, 2022 (JP) ................. 2022-138037

(51) Int. Cl.
  *G08G 1/16* (2006.01)
  *B60Q 9/00* (2006.01)
  *G08G 1/052* (2006.01)
  *G08G 1/056* (2006.01)

(52) U.S. Cl.
  CPC .............. *B60Q 9/008* (2013.01); *G08G 1/16* (2013.01)

(58) Field of Classification Search
  None
  See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 2017/0227637 A1* | 8/2017 | Hada .................... G01S 17/931 |
| 2019/0001968 A1 | 1/2019 | Yorifuji et al. | |
| 2019/0176696 A1 | 6/2019 | Iwasaki et al. | |

(Continued)

FOREIGN PATENT DOCUMENTS

| | | |
|---|---|---|
| JP | 2010079424 A | 4/2010 |
| JP | 2019104259 A | 6/2019 |

*Primary Examiner* — John F Mortell
(74) *Attorney, Agent, or Firm* — HAUPTMAN HAM, LLP

(57) ABSTRACT

Provided is a driving support device including: a side sensor configured to detect a target object existing on a lateral side of an own vehicle; and a control device configured to notify a driver of the own vehicle of existence of a target object approaching the own vehicle from the lateral side of the own vehicle when, at a time of entry of the own vehicle into an intersection, the target object exists and the target object is positioned in a notification target region. The notification target region is a region having a strip shape which is included in a road crossing a road on which the own vehicle is traveling or stopped, and which extends from the intersection in an extending direction of the road. The control device is configured to acquire a size of the intersection, and to determine a width of the notification target region in accordance with the size of the intersection.

16 Claims, 4 Drawing Sheets

(56) References Cited

U.S. PATENT DOCUMENTS

2019/0344828 A1 11/2019 Omori et al.
2019/0389488 A1 12/2019 Yamada et al.
2021/0312804 A1* 10/2021 Tsai ..................... G08G 1/096

* cited by examiner

| $\Delta W \leqq \Delta Wth1$ | $\Delta Wa1$ |
|---|---|
| $\Delta Wth1 < \Delta W \leqq \Delta Wth2$ | $\Delta Wa2$ |
| $\Delta Wth2 < \Delta W$ | $\Delta Wa3$ |

DB

FIG.4

DRIVING SUPPORT DEVICE, DRIVING SUPPORT METHOD, AND DRIVING SUPPORT PROGRAM FOR NOTIFYING A DRIVER OF A VEHICLE OF A TARGET OBJECT APPROACHING THE VEHICLE

RELATED APPLICATIONS

The present application claims priority to Japanese Patent Application No. 2022-138037, filed Aug. 31, 2022, the disclosure of which is hereby incorporated by reference herein in its entirety.

BACKGROUND OF THE INVENTION

1. Field of the Invention

The present invention relates to a driving support device, a driving support method, and a driving support program which notify, when a target object is approaching from a lateral side at the time of entry of an own vehicle into an intersection, a driver of the own vehicle of existence of the target object.

2. Description of the Related Art

There has been proposed a driving support device which notifies, when a target object (for example, another vehicle) is approaching from a lateral side at the time of entry of an own vehicle into an intersection, a driver of the own vehicle of existence of the target object (see, for example, Japanese Patent Application Laid-open No. 2019-104259). The driving support device (hereinafter referred to as "related-art device") as described in Japanese Patent Application Laid-open No. 2019-104259 includes a side radar and a control device. The side radar detects a target object (three-dimensional object) existing on the lateral side of the own vehicle, and outputs a result of the detection. The control device acquires the detection result from the side radar, and determines whether or not the target object is approaching (moving toward the own vehicle side) from the lateral side of the own vehicle based on the detection result. When the control device determines that the target object is approaching from the lateral side of the own vehicle at the time of entry of the own vehicle into the intersection, the control device issues a warning to the driver of the own vehicle.

The related-art device is sometimes configured to issue the warning when the target object approaching the own vehicle exists in a predetermined notification target region at the time of entry of the own vehicle into an intersection. Moreover, in the related-art device, a size of the notification target region is constant regardless of a size (a road width of a second road crossing a first road on which the own vehicle is traveling or stopped) of the intersection which the own vehicle is to enter. Thus, the notification target region may be too small depending on the size of the intersection, and hence there is fear that omission of the notification may occur. In another case, the notification target region may be too large, and hence there is fear that unnecessary notification may occur. For example, when the size of the intersection is large (for example, when the second road is formed of a plurality of lanes), the notification target region may be set to a relatively small region of the second road on the own vehicle side (for example, only a first lane closest to the own vehicle). In this case, even when a target object existing on a second lane which is included in the second road and which is next to the first lane is approaching the own vehicle, the warning is not issued. That is, there is fear that the omission of the notification for a target object approaching from the lateral side of the own vehicle may occur. Meanwhile, for example, when the size of the intersection is small, the warning may be issued for a target object traveling on a lane visually recognizable in this intersection (for example, a lane apart from the own vehicle in this intersection). However, such a target object is visually recognizable, and hence, when the warning is issued for this target object, there is fear that the driver may be bothered by this warning.

SUMMARY OF THE INVENTION

One object of the present invention is to provide a driving support device capable of suppressing notification omission for a target object approaching from a lateral side in an intersection and suppressing excessive notification (notification felt unnecessary by a driver).

In order to achieve the above-mentioned object, according to at least one embodiment of the present invention, there is provided a driving support device (1) including: a side sensor (22) configured to detect a target object (OB) existing on a lateral side of an own vehicle; and a control device (10) configured to notify of existence of a target object approaching the own vehicle from the lateral side of the own vehicle when, at a time of entry of the own vehicle into an intersection (C), the target object exists and the target object is positioned in a notification target region (AR), the notification target region being a region having a strip shape which is included in a second road (R2) crossing a first road (R1) on which the own vehicle is traveling or stopped in the intersection, and which extends from the intersection in an extending direction of the second road. The control device is configured to acquire a size ($\Delta W$) of the intersection, and to determine a width ($\Delta Wa$) of the notification target region in accordance with the size of the intersection.

According to the at least one embodiment of the present invention, the width of the notification target region is set in accordance with the size of the intersection. As a result, the notification omission can be suppressed, and the excessive notification (notification felt unnecessary by the driver) can be suppressed.

The driving support device according to one aspect of the present invention further includes a camera (23) configured to capture a region including the intersection, and the control device is configured to acquire the size of the intersection based on an image of the region being captured by the camera and including the intersection.

In this case, for example, the control device can acquire the size of the intersection based on an image of a stop line (SL) drawn on the first road and facing the intersection, an image of a center line of the second road, and the like which are captured by the camera. Moreover, the control device can acquire, as the size of the intersection, a distance from the stop line to a center portion (CL) of the second road in the width direction.

With this configuration, the control device can relatively easily acquire the size of the intersection.

In the driving support device according to another aspect of the present invention, the control device is configured to estimate a traveling direction of the own vehicle in the intersection, and to determine the width of the notification target region in accordance with the size of the intersection and an estimation result of the traveling direction of the own vehicle.

With this configuration, unnecessary notification can efficiently be suppressed.

Moreover, a driving support method and a driving support program according to at least one embodiment of the present invention include steps executed by each device forming the above-mentioned driving support device. According to the above-mentioned method and program, the width of the notification target region is set in accordance with the size of the intersection. As a result, the notification omission can be suppressed, and the excessive notification (the notification felt unnecessary by the driver) can be suppressed.

BRIEF DESCRIPTION OF THE DRAWINGS

FIG. 4 is a table for showing a database for determining a width of the notification target region.

DESCRIPTION OF THE EMBODIMENTS (Overview)

Figure 1:
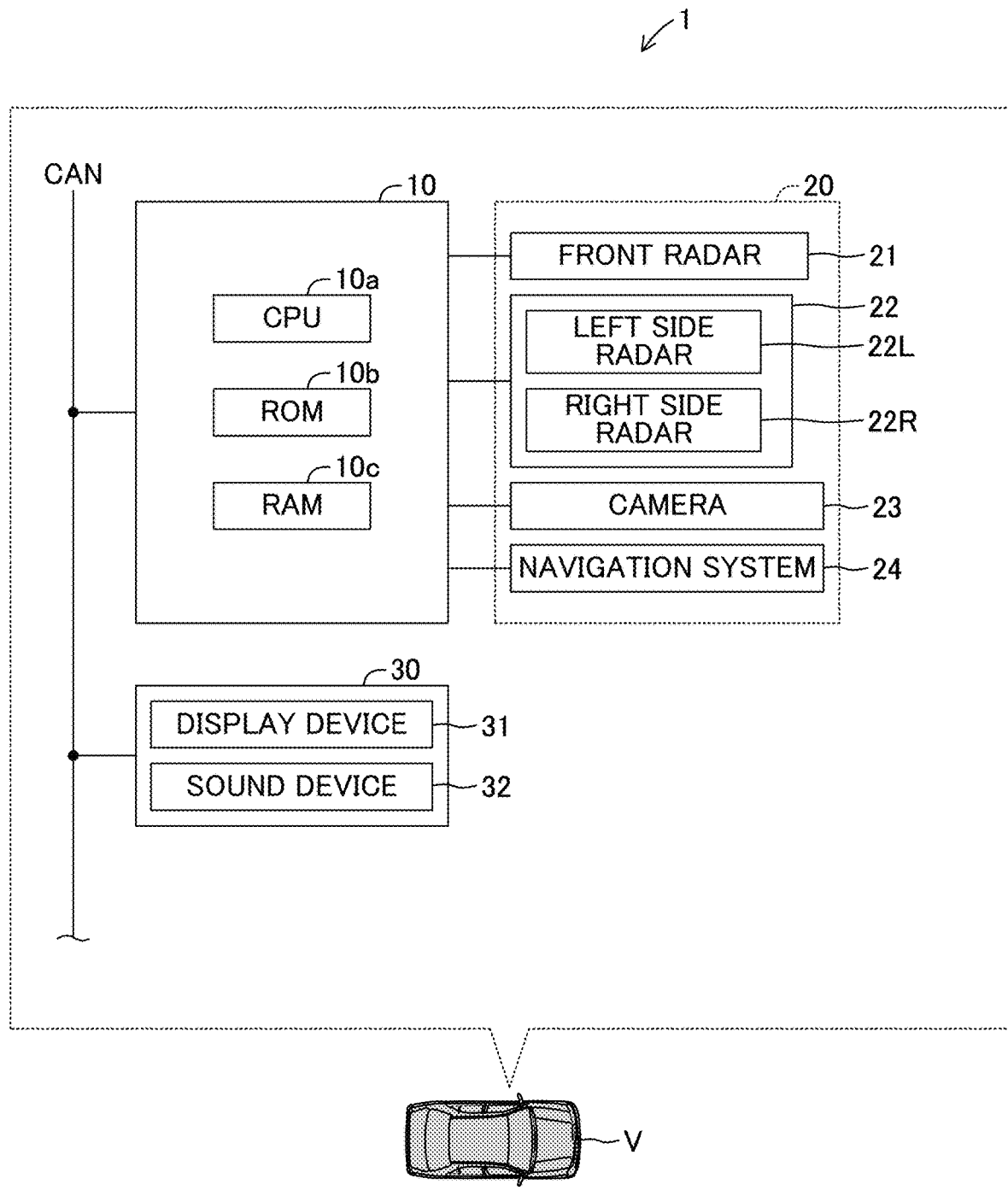
FIG. 1 is a block diagram of a driving support device according to at least one embodiment of the present invention.

As illustrated in FIG. 1, a driving support device 1 according to at least one embodiment of the present invention is mounted to a vehicle V (hereinafter referred to as "own vehicle") having a self-driving function. The driving support device 1 has a function (front cross traffic alert function (FCTA)) of notifying a driver of the own vehicle of existence of a target object approaching from a lateral side when the own vehicle enters an intersection under a situation in which the self-driving function is disabled and the driver is initiatively executing a driving operation.

(Specific Configuration)

As illustrated in FIG. 1, the driving support device 1 includes a driving support ECU 10, in-vehicle sensors 20, and a warning device 30.

The driving support ECU 10 includes a microcomputer including, for example, a CPU 10a, a ROM 10b, and a RAM 10c. The driving support ECU 10 is connected to other ECUs forming the own vehicle via a controller area network (CAN).

The in-vehicle sensors 20 include sensors which acquire information on target objects existing in a periphery of the own vehicle.

Specifically, the in-vehicle sensors 20 include a front radar 21, side radars 22, and a camera 23.

Figure 2:
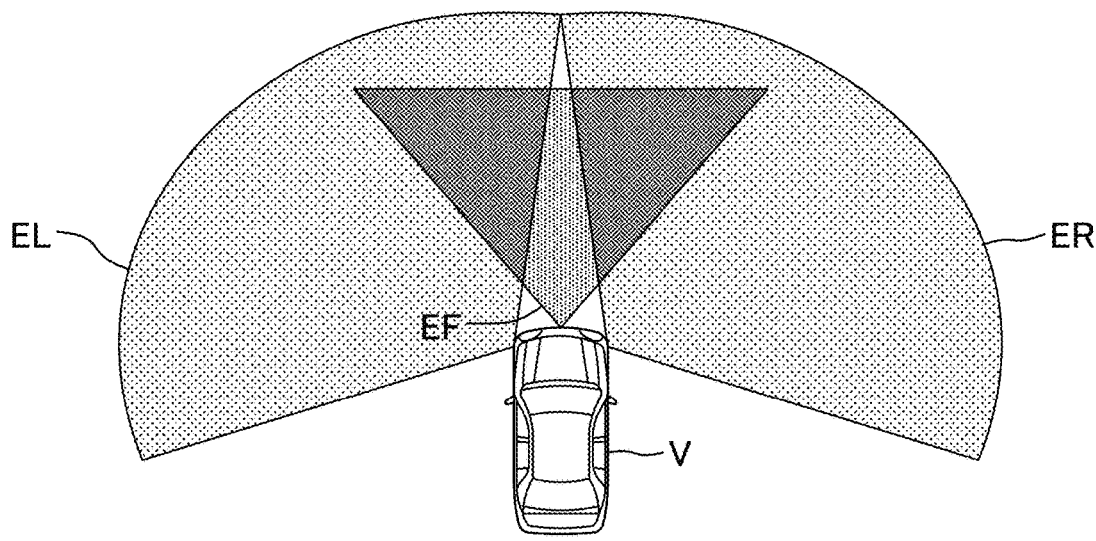
FIG. 2 is a plan view for illustrating detection ranges of a front radar and side radars.

The front radar 21 includes a transmission and reception unit and a signal processing unit (not shown). The transmission and reception unit is directed forward in a front portion (for example, in a vicinity of an emblem) of the own vehicle. As illustrated in FIG. 2, the transmission and reception unit of the front radar 21 forward radiates a radio wave in the millimeter wave band (hereinafter referred to as "millimeter wave"), and receives the millimeter wave (that is, reflected wave) reflected by a three-dimensional object existing in a radiation range EF in front of the own vehicle. The signal processing unit calculates the distance between the own vehicle and the three-dimensional object, a relative speed between the own vehicle and the three-dimensional object, a relative position (orientation) of the three-dimensional object with respect to the own vehicle, and the like based on a phase difference between the transmitted millimeter wave and the received reflected wave, an attenuation level of the reflected wave, a time from the transmission of the millimeter wave to the reception of the reflected wave, and the like, and transmits the distance, the relative speed, the relative position, and the like to the driving support ECU 10.

As illustrated in FIG. 1, the side radars 22 include a left side radar 22L and a right side radar 22R. Each of the left side radar 22L and the right side radar 22R includes the same transmission and reception unit and signal processing unit as those of the front radar 21. As illustrated in FIG. 2, the transmission and reception unit of the left side radar 22L is directed toward a left side (or a diagonally left front side) at a position slightly in front of a tire house for a left front wheel on a left side surface portion of the own vehicle. The transmission and reception unit of the left side radar 22L emits a millimeter wave toward the left side of the own vehicle, and receives the millimeter wave (reflected wave) reflected by a three-dimensional object existing in a radiation range EL. The transmission and reception unit of the right side radar 22R is directed toward a right side (or a diagonally front right side) at a position slightly in front of a tire house for a right front wheel on a right side surface portion of the own vehicle. The transmission and reception unit of the right side radar 22R emits a millimeter wave toward the right side of the own vehicle, and receives the millimeter wave (reflected wave) reflected by a three-dimensional object existing in a radiation range ER. The other configurations of the side radars 22 are the same as the configuration of the front radar 21.

The camera 23 includes an image pickup device and an image analysis device. The image pickup device is, for example, a digital camera having a built-in image pickup element being a charge-coupled device (CCD) or a CMOS image sensor (CIS). The image pickup device faces forward in the front portion of the own vehicle. The image pickup device captures a peripheral region (in particular, front region) of the own vehicle at a predetermined frame rate to acquire image data. When an intersection exists in the peripheral region (in particular, front region) of the own vehicle, the image pickup device captures a region including the intersection. The image pickup device transmits each piece of image data to the image analysis device. The image analysis device analyzes the acquired image data, to thereby acquire information on target objects existing around the own vehicle from images of the image data. For example, the image analysis device recognizes a traffic light, a sign drawn on a road (for example, a stop line and an intersection cross mark), and the like, and transmits results of the recognition to the driving support ECU 10.

As illustrated in FIG. 1, the in-vehicle sensors 20 include a navigation system 24.

The navigation system 24 receives GPS signals from a plurality of artificial satellites, and acquires a current position PV (latitude and longitude) of the vehicle V based on the received plurality of GPS signals. Moreover, the navigation system 24 stores map data representing a map. The map data includes intersection data representing a position of an intersection (for example, a longitude and a latitude of a center of the intersection and a longitude and a latitude of each of predetermined points in an outer peripheral portion of the intersection (region in which two roads cross)). The navigation system 24 transmits position data representing the current position PV, the position of the intersection, and the like to the driving support ECU 10.

The warning device 30 includes a display device 31 and a sound device 32. The display device 31 is formed of a liquid crystal display device, a head-up display device, or the like. The display device 31 acquires display data from the driving support ECU 10, and displays an image in accordance with this display data. The sound device 32 is formed of an amplification device and a speaker device. The sound device 32 acquires sound data from the driving support ECU 10, and reproduces sound in accordance with this sound data.

(Operation)

Figure 3:
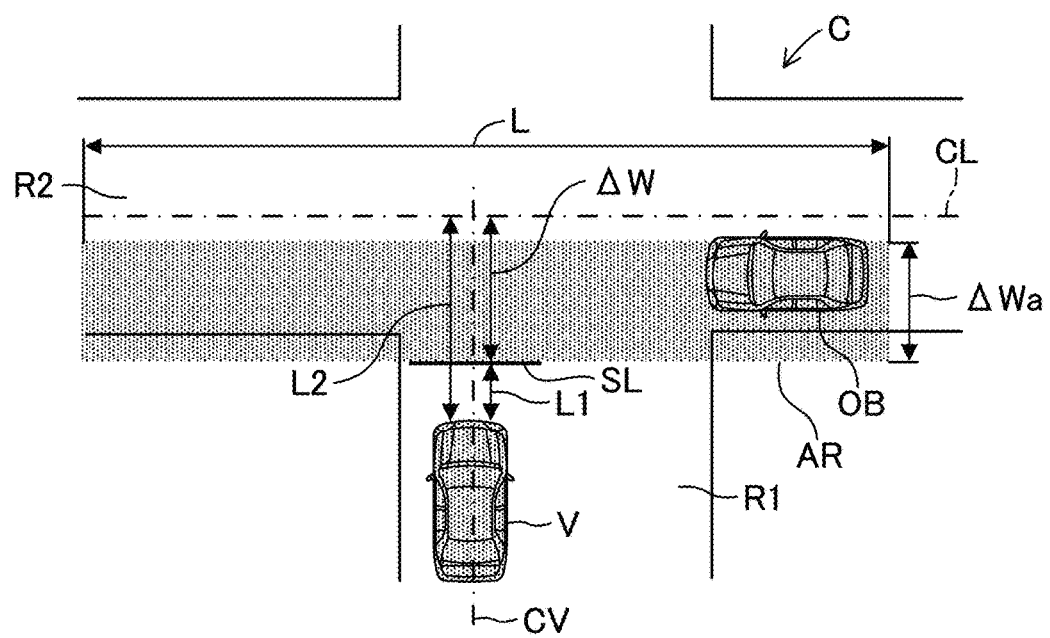
FIG. 3 is a plan view for illustrating a notification target region.

The driving support ECU 10 determines whether or not the own vehicle is entering an intersection C (a region in which a road R1 on which the own vehicle is traveling or stopped and another road R2 are crossing each other) based on the image data acquired from the camera 23. For example, as illustrated in FIG. 3, the driving support ECU 10 acquires a recognition result of the stop line SL captured by the camera 23, drawn on the road R1, and facing the intersection C, and sequentially calculates a distance L1 from a front end of the own vehicle to the stop line SL based on this recognition result. When the distance L1 becomes equal to or shorter than a threshold value, the driving support ECU 10 determines that the own vehicle is entering the intersection C. Moreover, for example, the driving support ECU 10 may acquire, from the navigation system 24, the current position PV of the own vehicle and coordinates of the intersection C (for example, coordinates of an end portion of the intersection C on the own vehicle side), and may calculate the distance between the own vehicle and the intersection C based on data on the current position PV and the coordinates of the intersection C. Then, when a result of the calculation becomes equal to or smaller than the threshold value, the driving support ECU 10 may determine that the own vehicle is entering the intersection C.

When the driving support ECU 10 determines that the own vehicle is entering the intersection C, the driving support ECU 10 executes FCTA control described below.

<FCTA Control>

The driving support ECU 10 determines whether or not a target object OB (another vehicle, a pedestrian, or the like) is approaching from the lateral side of the own vehicle based on the information acquired from the side radars 22. Specifically, the driving support ECU 10 acquires, from the side radars 22, information on a distance between the own vehicle and the target object OB at predetermined time intervals. Then, when the distance between the own vehicle and the target object OB is decreasing, the driving support ECU 10 determines that the target object OB is approaching.

When the driving support ECU 10 determines that a target object OB approaching from the lateral side of the own vehicle exists, the driving support ECU 10 determines whether or not this target object OB is positioned within a predetermined notification target region AR set for the intersection C. The notification target region AR is a region having a strip shape which extends, in front of the own vehicle positioned immediately before the intersection C, from the intersection C in an extending direction of the road R2. The notification target region AR may include a region inside this intersection C. For example, as illustrated in FIG. 3, it is possible to employ, as the notification target region AR, of a region inside the intersection C, a region in front of the own vehicle and a region extending from this front region toward the left side and the right side equally by a predetermined distance along the extending direction of the road R2. Moreover, in this case, one end (long side) of the notification target region AR in the width direction matches the stop line SL in plan view. The notification target region AR can be defined by a width and a length. The width of the notification target region AR is a dimension of the notification target region AR in the width direction of the road R2 crossing the road R1 on which the own vehicle is traveling in the intersection C. The length of the notification target region AR is a dimension of the notification target region AR in the extending direction of the road R2.

The driving support ECU 10 determines the notification target region AR as follows. First, the driving support ECU 10 acquires the size of the intersection C. Specifically, as illustrated in FIG. 3, the driving support ECU 10 calculates a difference $\Delta W$ $(=L2-L1)$ between a distance L2 from the front end of the own vehicle to a center position (center line CL) of the road R2 in the width direction and the distance L1. After that, the driving support ECU 10 acquires the calculated difference $\Delta W$ as the size of the intersection C. The difference $\Delta W$ is a distance from the stop line SL to the center position (center line CL) of the road R2 in the width direction. That is, the driving support ECU 10 acquires a size of the half of the width of the road R2 as the size of the intersection C.

Subsequently, the driving support ECU 10 determines a width $\Delta Wa$ of the notification target region AR in accordance with a predetermined database DB of FIG. 4. Specifically, the driving support ECU 10 sets the width $\Delta Wa$ to a first predetermined value $\Delta Wa1$ in a first situation in which the difference $\Delta W$ is equal to or smaller than a first threshold value $\Delta Wth1$. The driving support ECU 10 sets the width $\Delta Wa$ to a second predetermined value $\Delta Wa2$ larger than the first predetermined value $\Delta Wa1$ in a second situation in which the difference $\Delta W$ is larger than the first threshold value $\Delta Wth1$ and is equal to or smaller than a second threshold value $\Delta Wth2$. Moreover, the driving support ECU 10 sets the width $\Delta Wa$ to a third predetermined value $\Delta Wa3$ larger than the second predetermined value $\Delta Wa2$ in a third situation in which the difference $\Delta W$ is larger than the second threshold value $\Delta Wth2$. A length L (a length in the extending direction of the road R2) of the notification target region AR is constant independently of the size of the intersection C, and a value of the length L is determined in advance.

For example, the first threshold value $\Delta Wth1$ and the first predetermined value $\Delta Wa1$ is 5 meters (corresponding to a width of one lane). Moreover, the second threshold value $\Delta Wth2$ and the second predetermined value $\Delta Wa2$ is 10 meters (corresponding to a width of two lanes). Further, the third predetermined value $\Delta Wa3$ is 15 meters (corresponding to a width of three lanes). Still further, for example, the length L of the notification target region AR is 15 meters. The distance from a center line CV passing through a center portion of the own vehicle in a vehicle width direction to each of one end portion and another end portion of the notification target region AR in a length direction is 7.5 meters.

The driving support ECU 10 determines whether or not the target object OB approaching the own vehicle from the lateral side is positioned in the notification target region AR determined as described above. When the driving support ECU 10 determines that the target object OB is positioned in the notification target region AR, the driving support ECU 10 notifies the driver of the own vehicle of the existence of this target object OB. Specifically, when the own vehicle is stopped, the driving support ECU 10 causes the display device 31 of the warning device 30 to display a predetermined image for attracting attention to the approach of the target object from the lateral side. Meanwhile, when the own vehicle is continuing a forward movement toward the intersection C, or the own vehicle starts after having temporarily stopped immediately before the intersection C, the driving support ECU 10 causes the display device 31 to display the above-mentioned predetermined image, and causes the sound device 32 to reproduce predetermined sound for attracting the above-mentioned attention.

Figure 5:
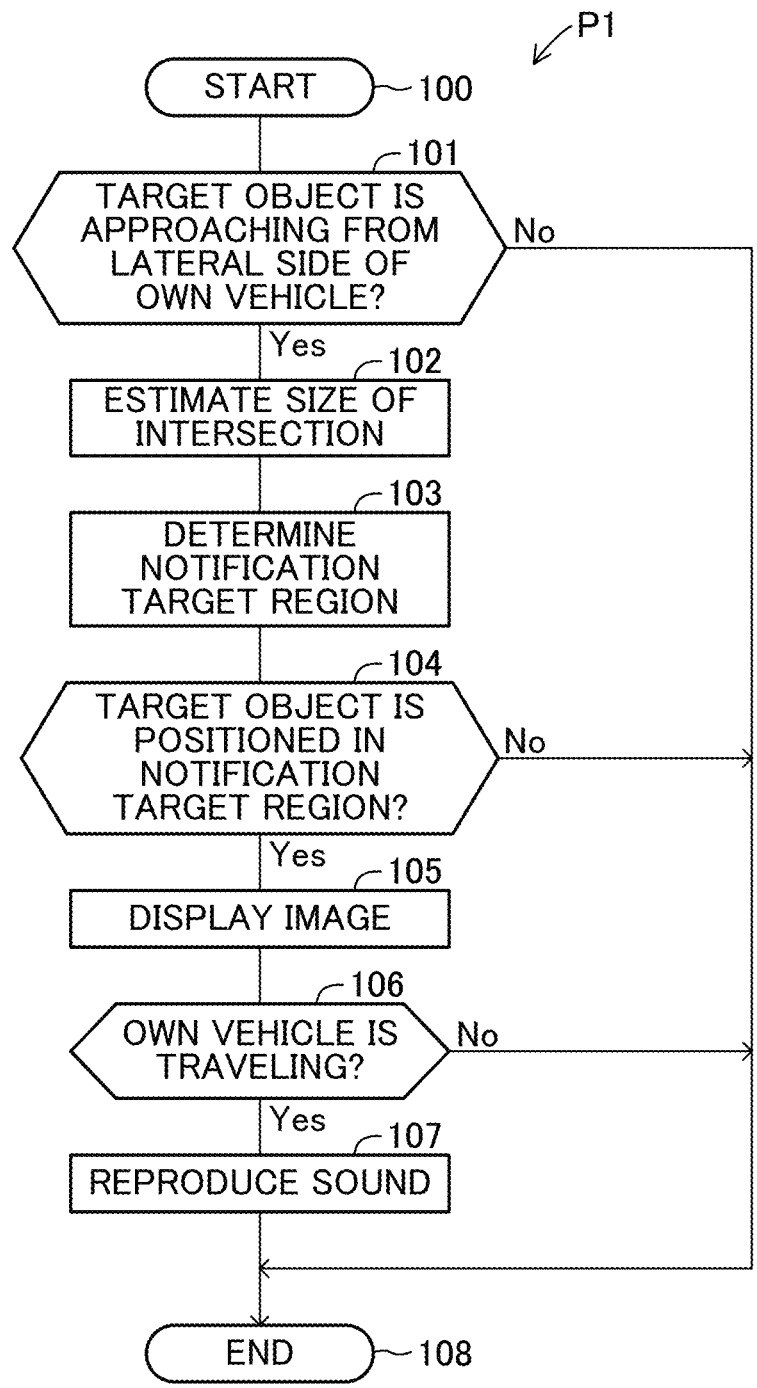
FIG. 5 is a flowchart of a computer program for implementing FCTA control.

With reference to FIG. 5, a specific description is now given of an operation (a program P1 for executing the FCTA control) of the driving support ECU 10 (hereinafter simply referred to as "CPU").

The CPU sequentially determines whether or not the own vehicle is entering an intersection C when an ignition switch of the own vehicle is in an ON state. When the CPU determines that the own vehicle is entering an intersection C, the CPU starts the execution of the program P1 from Step 100, and advances the process to Step 101.

In Step 101, the CPU determines whether or not the target object OB is approaching from the lateral side of the own vehicle based on the data acquired from the side radars 22. When a target object OB approaching from the lateral side of the own vehicle exists (Yes in Step 101), the CPU advances the process to Step 102. Meanwhile, when a target object OB approaching from the lateral side of the own vehicle does not exist (No in Step 101), the CPU advances the process to Step 108, and finishes the execution of the program P1.

In Step 102, the CPU estimates the size of the intersection C, and advances the process to Step 103.

In Step 103, the CPU determines the notification target region AR. That is, the CPU refers to the database DB, and acquires the width $\Delta Wa$ corresponding to the size of the intersection C. Moreover, the CPU acquires the length L of the notification target region AR set in advance. After that, the CPU sets the notification target region AR for the intersection C based on the acquired width $\Delta Wa$ and length L. Specifically, in a plane coordinate system including the own vehicle and the intersection C, the CPU sets a region (length region) having a length L/2 from the center line CV of the own vehicle toward each of the left side and the right side, and then sets a region (width region) having the width $\Delta Wa$ from the end portion (for example, the position of the stop line SL) of the intersection C on the side closer to the own vehicle in the extending direction of the road R1 toward the direction departing from the own vehicle. The CPU then sets a region on which the set length region and width region overlap each other as the notification target region AR. After that, the CPU advances the process to Step 104.

In Step 104, the CPU determines whether or not the target object OB is positioned in the notification target region AR. When the target object OB is positioned in the notification target region AR (Yes in Step 104), the CPU advances the process to Step 105. Meanwhile, when the target object OB is positioned outside the notification target region AR (No in Step 104), the CPU advances the process to Step 108. That is, in this case, the CPU does not notify of the existence of the target object OB.

In Step 105, the CPU causes the display device 31 to display the predetermined image for attracting attention, and advances the process to Step 106.

In Step 106, the CPU acquires a vehicle speed of the own vehicle from a vehicle speed sensor (not shown), and determines whether or not the own vehicle is traveling based on data on the vehicle speed. When the own vehicle is traveling (Yes in Step 106), the CPU advances the process to Step 107. Meanwhile, when the own vehicle is stopped (No in Step 106), the CPU advances the process to Step 108.

In Step 107, the CPU causes the sound device 32 to reproduce the predetermined sound for attracting attention.

The CPU then advances the process to Step 108, and finishes the execution of the program P1.

Effects

With the driving support device 1 according the at least one embodiment, the width $\Delta Wa$ of the notification target region AR is set in accordance with the size of the intersection C (the road width of the road R2). As a result, notification omission can be suppressed, and unnecessary notification can be suppressed.

The present invention is not limited to the at least one embodiment described above, and various modification examples can be adopted within the scope of the present invention.

Modification Example 1

The driving support ECU 10 may estimate a behavior of the own vehicle traveling in the intersection C, and may set the width $\Delta Wa$ (correct the width $\Delta Wa$ set by referring to the database DB) in accordance with a result of the estimation. For example, the driving support device 1 includes, as one of the in-vehicle sensors 20, a sensor which detects a direction indicated by a direction indicator of the own vehicle, and is configured to estimate the traveling direction (left turn, right turn, or straight travel) of the own vehicle in the intersection C based on the detection result of this sensor. When the left-hand traffic (right-hand traffic) is required, the driving support ECU 10 preferably makes such setting that the width $\Delta Wa$ at the time when the own vehicle is to make a left turn (right turn) at the intersection C is narrower than the width $\Delta Wa$ at the time when the own vehicle is to make the straight travel or the right turn (left turn) at the intersection C. That is, when the own vehicle is to make the left turn (right turn) at the intersection C, the driving support ECU 10 preferably limits the notification target region AR to the lane of the second road R2 on the own vehicle side. Specifically, when the own vehicle is to make the left turn (right turn) at the intersection C in the second situation, the driving support ECU 10 preferably sets the width $\Delta Wa$ to a predetermined value $\Delta Wa1$ smaller than a predetermined value $\Delta Wa2$. When the own vehicle is to make the right turn (left turn) or the straight travel at the intersection C in the second situation, the driving support ECU 10 preferably sets the width $\Delta Wa$ to the predetermined value $\Delta Wa2$. Moreover, when the own vehicle is to make the left turn (right turn) at the intersection C in the third situation, the driving support ECU 10 preferably sets the width $\Delta Wa$ to the predetermined value $\Delta Wa2$ smaller than the predetermined value $\Delta Wa3$. When the own vehicle is to make the right turn (left turn) or the straight travel at the intersection C in the third situation, the driving support ECU 10 preferably sets the width $\Delta Wa$ to the predetermined value $\Delta Wa3$. As a result, the notification unnecessary for the driver is efficiently suppressed.

Modification Example 2

The driving support ECU 10 refers to the database DB to determine the width $\Delta Wa$ in the at least one embodiment, but, in place of the database DB, the driving support ECU 10 may determine the width $\Delta Wa$ based on a predetermined calculation expression. In this case, it is preferred to determine the width $\Delta Wa$ based on the predetermined calculation expression such that as the difference $\Delta W$ becomes larger, the width $\Delta Wa$ becomes larger.

Modification Example 3

The method of obtaining the size of the intersection C is not limited to that in the at least one embodiment. For example, map information of the navigation system 24 may include the size of each intersection C (the size of the road R2 in the road width direction). In this case, the driving support ECU 10 is only required to acquire, at the time of entry into an intersection C, the size of this intersection C from the navigation system 24. Moreover, when a camera is installed at the intersection C, the size of the intersection C may be acquired based on an image captured by this camera.

The vehicle V may be an autonomous vehicle.

What is claimed is:

1. A driving support device, comprising:
  a side sensor configured to detect a target object existing on a lateral side of an own vehicle; and
  a control device configured to notify a driver of the own vehicle of existence of the target object approaching the own vehicle from the lateral side of the own vehicle when, at a time of entry of the own vehicle into an intersection, the target object exists and the target object is positioned in a notification target region,
  the notification target region having a strip shape which is included in a second road crossing a first road on which the own vehicle is traveling or stopped in the intersection,
  the notification target region extending from the intersection in an extending direction of the second road,
  wherein
  the control device is configured to
    acquire a size of the intersection, and
    determine a width of the notification target region in accordance with the size of the intersection by
      setting the width of the notification target region to a first predetermined value in a first situation where the acquired size of the intersection is equal to or less than a first threshold,
      setting the width of the notification target region to a second predetermined value, which is larger than the first predetermined value, in a second situation where the acquired size of the intersection exceeds the first threshold but is equal to or less than a second threshold, and
      setting the width of the notification target region to a third predetermined value, which is larger than the second predetermined value, in a third situation where the acquired size of the intersection exceeds the second threshold,
  the first threshold and the first predetermined value correspond to a width of a single lane,
  the second threshold and the second predetermined value correspond to a width of two lanes, and
  the third predetermined value corresponds to a width of three lanes.

2. The driving support device according to claim 1, further comprising a camera configured to capture a region including the intersection,
  wherein the control device is configured to acquire the size of the intersection based on an image of the region being captured by the camera and including the intersection.

3. The driving support device according to claim 1, wherein the control device is configured to estimate a traveling direction of the own vehicle in the intersection, and to determine the width of the notification target region in accordance with the size of the intersection and an estimation result of the traveling direction of the own vehicle.

4. A driving support method, comprising:
  acquiring, from a side sensor of an own vehicle, information on a target object existing on a lateral side of the own vehicle; and
  notifying a driver of the own vehicle of existence of the target object approaching the own vehicle from the lateral side of the own vehicle when, at a time of entry of the own vehicle into an intersection, the target object exists and the target object is positioned in a notification target region,
  the notification target region being a region having a strip shape which is included in a second road crossing a first road on which the own vehicle is traveling or stopped in the intersection,
  the notification target region extending from the intersection in an extending direction of the second road,
  wherein
  the notifying includes
    acquiring a size of the intersection, and
    determining a width of the notification target region in accordance with the size of the intersection by
      setting the width of the notification target region to a first predetermined value in a first situation where the acquired size of the intersection is equal to or less than a first threshold,
      setting the width of the notification target region to a second predetermined value, which is larger than the first predetermined value, in a second situation where the acquired size of the intersection exceeds the first threshold but is equal to or less than a second threshold, and
      setting the width of the notification target region to a third predetermined value, which is larger than the second predetermined value, in a third situation where the acquired size of the intersection exceeds the second threshold,
  the first threshold and the first predetermined value correspond to a width of a single lane,
  the second threshold and the second predetermined value correspond to a width of two lanes, and
  the third predetermined value corresponds to a width of three lanes.

5. A non-transitory storage medium storing a driving support program for causing a computer of an own vehicle to execute:
  acquiring, from a side sensor of the own vehicle, information on a target object existing on a lateral side of the own vehicle; and
  notifying a driver of the own vehicle of existence of a target object approaching the own vehicle from the lateral side of the own vehicle when, at a time of entry of the own vehicle into an intersection, the target object exists and the target object is positioned in a notification target region,
  the notification target region being a region having a strip shape which is included in a second road crossing a first road on which the own vehicle is traveling or stopped in the intersection, and which extends
  the notification target region extending from the intersection in an extending direction of the second road,
  wherein
  the notifying includes
    acquiring a size of the intersection, and determining a width of the notification target region in accordance with the size of the intersection by
setting the width of the notification target region to a first predetermined value in a first situation where the acquired size of the intersection is equal to or less than a first threshold,
setting the width of the notification target region to a second predetermined value, which is larger than the first predetermined value, in a second situation where the acquired size of the intersection exceeds the first threshold but is equal to or less than a second threshold, and
setting the width of the notification target region to a third predetermined value, which is larger than the second predetermined value, in a third situation where the acquired size of the intersection exceeds the second threshold,
the first threshold and the first predetermined value correspond to a width of a single lane,
the second threshold and the second predetermined value correspond to a width of two lanes, and
the third predetermined value corresponds to a width of three lanes.

6. The driving support device according to claim 1, wherein
the control device is configured to
set the width of the notification target region to the first predetermined value in response to determining that the own vehicle is to make a left turn at the intersection in the second situation, and
set the width of the notification target region to the second predetermined value in response to determining that the own vehicle is to make a right turn or a straight travel at the intersection in the second situation.

7. The driving support device according to claim 6, wherein
the control device is configured to,
set the width of the notification target region to the second predetermined value in response to determining that the own vehicle is to make the left turn at the intersection in the third situation, and
set the width of the notification target region to the third predetermined value in response to determining that the own vehicle is to make the right turn or the straight travel at the intersection in the third situation.

8. The driving support device according to claim 7, wherein
the width of the two lanes is equal to two of the width of the single lane, and
the width of the three lanes is equal to three of the width of the single lane.

9. The driving support device according to claim 7, further comprising a camera configured to capture an image of a stop line on the first road and facing the intersection and an image of a center line of the second road,
wherein the control device is configured to acquire the size of the intersection based on the captured image of the stop line and the captured image of the center line of the second road.

10. The driving support device according to claim 9, wherein the control device is configured to acquire, as the size of the intersection, a distance from the stop line to the center line of the second road.

11. The driving support device according to claim 10, wherein the control device is configured to estimate a traveling direction of the own vehicle in the intersection by causing a sensor of the own vehicle to detect a direction indicated by a direction indicator of the own vehicle.

12. The driving support device according to claim 11, wherein the control device is configured to set the width of the notification target region at a time when the estimated traveling direction of the own vehicle is a left turn at the intersection to be narrower than the width of the notification target region at a time when the estimated traveling direction of the own vehicle is to straight or the right turn at the intersection.

13. The driving support device according to claim 12, wherein the control device is configured to
acquire, from a navigation system of the own vehicle, a current position of the own vehicle and coordinates of the intersection,
calculate a distance between the own vehicle and the intersection based on the acquired current position of the own vehicle and the acquired coordinates of the intersection, and
determine that the own vehicle is entering the intersection upon the distance becoming equal to or shorter than a threshold value.

14. The driving support device according to claim 13, wherein the control device is configured to, in response to the own vehicle being stopped in the intersection, cause a display of the own vehicle to display a predetermined image for attracting a driver's attention to an approach of the target object from the lateral side of the own vehicle.

15. The driving support device according to claim 14, wherein the control device is configured to, in response to the own vehicle continuing a forward movement toward the intersection,
cause the display to display the predetermined image, and
cause a sound device of the own vehicle to reproduce a predetermined sound for attracting the driver's attention.

16. The driving support device according to claim 14, wherein the control device is configured to, in response to the own vehicle starting moving after having temporarily stopped immediately before the intersection,
cause the display to display the predetermined image, and
cause a sound device of the own vehicle to reproduce a predetermined sound for attracting the driver's attention.

* * * * *